(12) United States Patent
Chitko et al.

(10) Patent No.: US 9,221,187 B2
(45) Date of Patent: Dec. 29, 2015

(54) MOVING SHEAR RAIL

(71) Applicants: Rodney H. Chitko, Laona, WI (US); Jeffrey J. Krueger, Crandon, WI (US)

(72) Inventors: Rodney H. Chitko, Laona, WI (US); Jeffrey J. Krueger, Crandon, WI (US)

(73) Assignee: Cleereman Industries, Inc., Newald, WI (US)

( * ) Notice: Subject to any disclaimer, the term of this patent is extended or adjusted under 35 U.S.C. 154(b) by 234 days.

(21) Appl. No.: 13/721,726

(22) Filed: Dec. 20, 2012

(65) Prior Publication Data

US 2014/0174274 A1 Jun. 26, 2014

(51) Int. Cl.
| | |
|---|---|
| B27B 31/06 | (2006.01) |
| B27B 31/08 | (2006.01) |
| B27B 15/04 | (2006.01) |
| B23D 53/04 | (2006.01) |
| B23D 61/12 | (2006.01) |

(52) U.S. Cl.
CPC ............. B27B 31/08 (2013.01); B27B 15/04 (2013.01); B23D 53/04 (2013.01); B23D 61/126 (2013.01); B27B 31/06 (2013.01); Y10T 83/707 (2015.04); Y10T 83/8742 (2015.04)

(58) Field of Classification Search
CPC .... B23D 53/04; B23D 61/126; Y10T 83/707; Y10T 83/8742; B27B 31/08
USPC ............. 83/424–425, 104, 150–56, 417, 364, 83/794, 734, 813, 788, 920, 315, 318, 320, 83/322; 144/376–379, 242.1, 245.1, 144/245.6, 250, 48.4
See application file for complete search history.

(56) References Cited

U.S. PATENT DOCUMENTS

| | | | | |
|---|---|---|---|---|
| 3,716,084 | A | * | 2/1973 | Hartzell et al. .................. 83/149 |
| 4,281,696 | A | | 8/1981 | Howard et al. |
| 4,519,283 | A | | 5/1985 | Sanborn |
| 4,539,877 | A | | 9/1985 | Stevenson |
| 4,665,786 | A | * | 5/1987 | Shields ........................... 83/364 |
| 4,697,487 | A | * | 10/1987 | Cameron ......................... 83/708 |
| 4,996,900 | A | | 3/1991 | Schmidt et al. |
| 5,421,385 | A | | 6/1995 | McGee |
| 7,163,244 | B2 | * | 1/2007 | Meltzer ......................... 293/128 |
| 7,530,298 | B2 | | 5/2009 | Peterson |

* cited by examiner

*Primary Examiner* — Ned Landrum
*Assistant Examiner* — Nhat Chieu Do
(74) *Attorney, Agent, or Firm* — Nicholas A. Kees; Godfrey & Kahn, S.C.

(57) ABSTRACT

A sawmill including a band saw, mounted on a carriage. A moving shear rail is connected to the carriage such that the shear rail moves in synchronization with the band saw. The moving shear rail has a notch formed in the upper edge, and is positioned so that the notch is aligned with the band saw blade, and the upper edge of the moving shear rail extends at least to even with the band saw blade, and possibly even beyond the saw blade. The moving shear rail includes a shear rail plate carrying the notch, and a flexible element connected at each end of the shear rail plate. The flexible element is formed of conveyor links reeved about a pair of reels, including a last link that is removably connected to the shear rail plate. Each of the reels is mounted to a standard, one having a pivot, allowing that reel to be pivoted away.

4 Claims, 10 Drawing Sheets

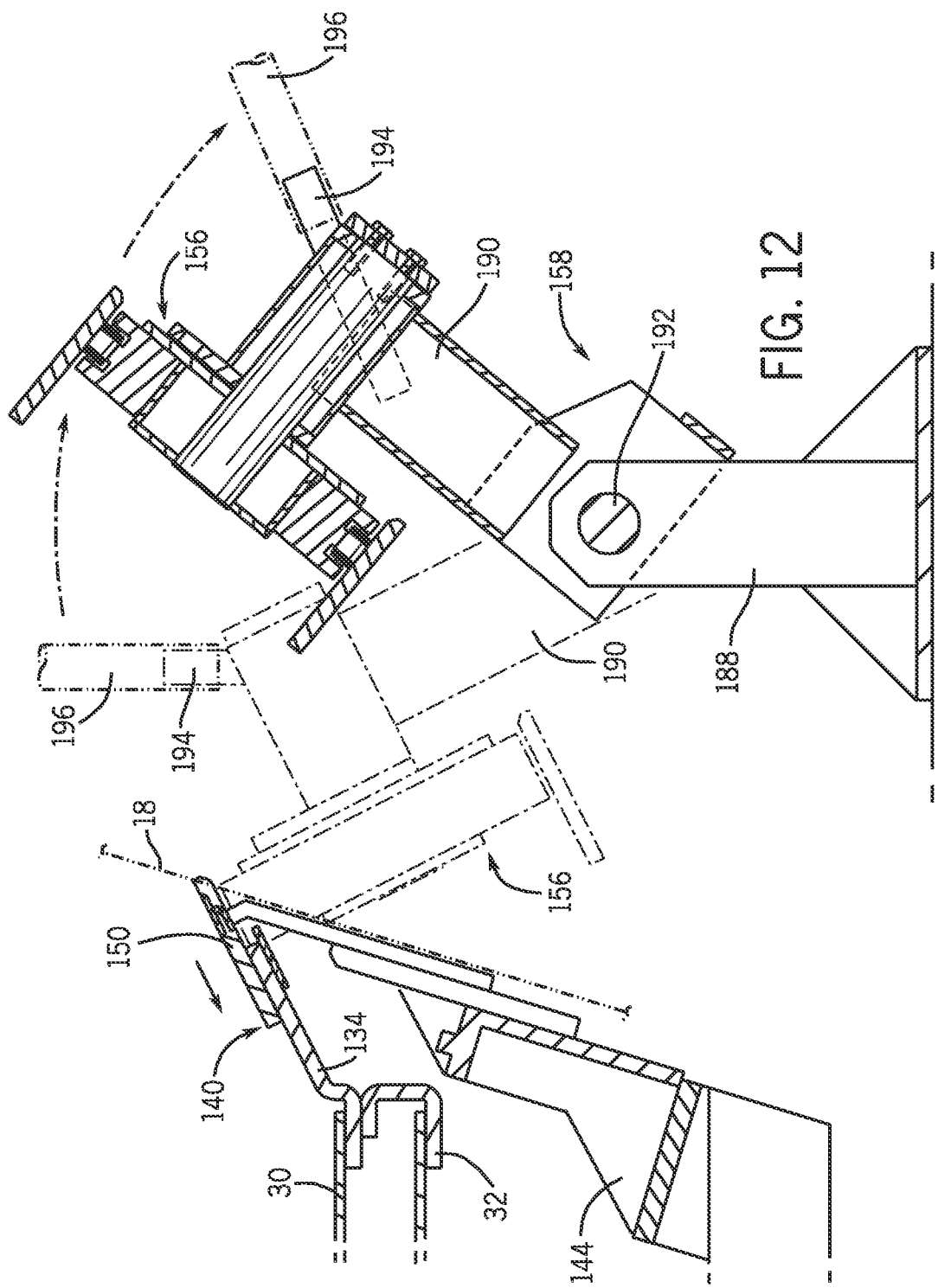

MOVING SHEAR RAIL

FIELD OF THE INVENTION

This invention relates to sawmill equipment, and in particular to devices intended for use with moving band saws within a saw mill.

BACKGROUND

There are many different types and styles of sawmills. As generally shown in FIGS. 1 and 2, a certain type of sawmill 10 employs a band saw 12, mounted on a carriage 14 that is capable of moving back and forth in a reciprocating motion along a track 16. Carriage 14 is moved back and forth by conventional means, such as a cable 14a attached at each end to a respective end of the carriage, driven by a prime mover 14b such as a hydraulic or electric motor, and reeved about a cable drum 14c and a remote cable tensioning wheel 14d before terminating at the carriage. While the cable arrangement is shown positioned at the right side of the carriage 14 for ease of depiction, it may just as well be positioned at the left side of the carriage.

The band saw 12 includes a continuous loop blade 18, which is driven by, among other things, a motor 20 and reeved about pulleys 22. In operation, a log 24 is held on a cradle or bunk 26 and oriented generally parallel to the track 16 and the direction of movement of the band saw 12. The bunk 26 holds the log 24 in proximity to the band saw blade 18, and has the capability to move the log toward the band saw 12, so at least some portion of the log extends beyond the bunk. Thus the band saw 12 is enabled to cut a segment 28 (FIG. 2) off the log, whether that segment be a slab (most likely waste) or a board or a plank. Once cut, each segment 28 ends up on a conveyor 30, supported on a conveyor support 32, to be conveyed to another destination for further processing. As the segment 28 is cut, the segment first contacts and drops onto a stationary shear rail 34, which is mounted to conveyor support 32 as is the conveyor 30, and extends outward from the side of the conveyor toward the uncut log 24, at an angle from close to the conveyor upward toward the log, so as to act as a ramp or funnel, the idea being that the segment will slide along that angle and end up on the conveyor, face up (that is, cut side down).

As can be seen in FIG. 2, a small gap 36 necessarily exists between the shear rail 34 and the band saw blade 18, as there must be a clearance between them in order for the blade to pass back and forth as it cuts the log 24. When the segment 28 is cut from the log 24, there is a chance that the segment could fall into that gap 36, and thereby become hung up. There are times when this hangup of the segment 28 in the gap 36 results in the serious problems for the sawmill, sometimes requiring a temporary shutdown so that the hangup can be cleared. More often, the edge of the segment 28 catches in the gap 36 and then flops over so that the fresh cut side 38 of the segment is oriented upward (the undesirable "face down" position, which is the opposite of the desired "face up" orientation referred to above) on the conveyor, as shown in FIG. 2.

This invention relates to improvements to the apparatus described above and to solutions to some of the problems raised or not solved thereby.

SUMMARY OF THE INVENTION

The invention provides a sawmill for cutting segments from a log. The sawmill includes a band saw, having a band saw blade, the blade having a predetermined width. The band saw is mounted on a carriage, which moves the band saw back and forth between two ends of travel. A moving shear rail is connected to the carriage such that the shear rail moves in synchronization with the band saw. The moving shear rail has an upper edge, and a notch formed in the upper edge, the moving shear rail positioned and supported on the carriage so that the notch is aligned with the band saw blade and the upper edge of the moving shear rail extends at least to even with the band saw blade, and preferably even beyond the saw blade. The moving shear rail includes a shear rail plate in which is formed the upper edge and the notch, and a flexible element connected at each end of the shear rail plate so as to move with the shear rail plate as the shear rail plate moves with the band saw. The flexible element is formed of conveyor links reeved about a pair of reels, one reel positioned in proximity to each of the band saw ends of travel. The conveyor links include a last link that is removably connected to the shear rail plate. The reels apply tension to the flexible element and the invention provides apparatus for selectably releasing tension on the flexible element, to thereby permit the last link to be disconnected from the shear rail plate. Each of the reels is mounted to one of two standards, each standard positioned in proximity to each of the band saw ends of travel. At least one of the standards includes a pivot, so that the reel mounted to that standard can be pivoted between two positions, an in-use position and an away position.

Other objects and advantages of the invention will become apparent hereinafter.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows:

FIG. 12 is an end view of the shear rail shown in FIG. 9, with the reel shown pivoted away from the conveyor.

DETAILED DESCRIPTION

Figure 3:
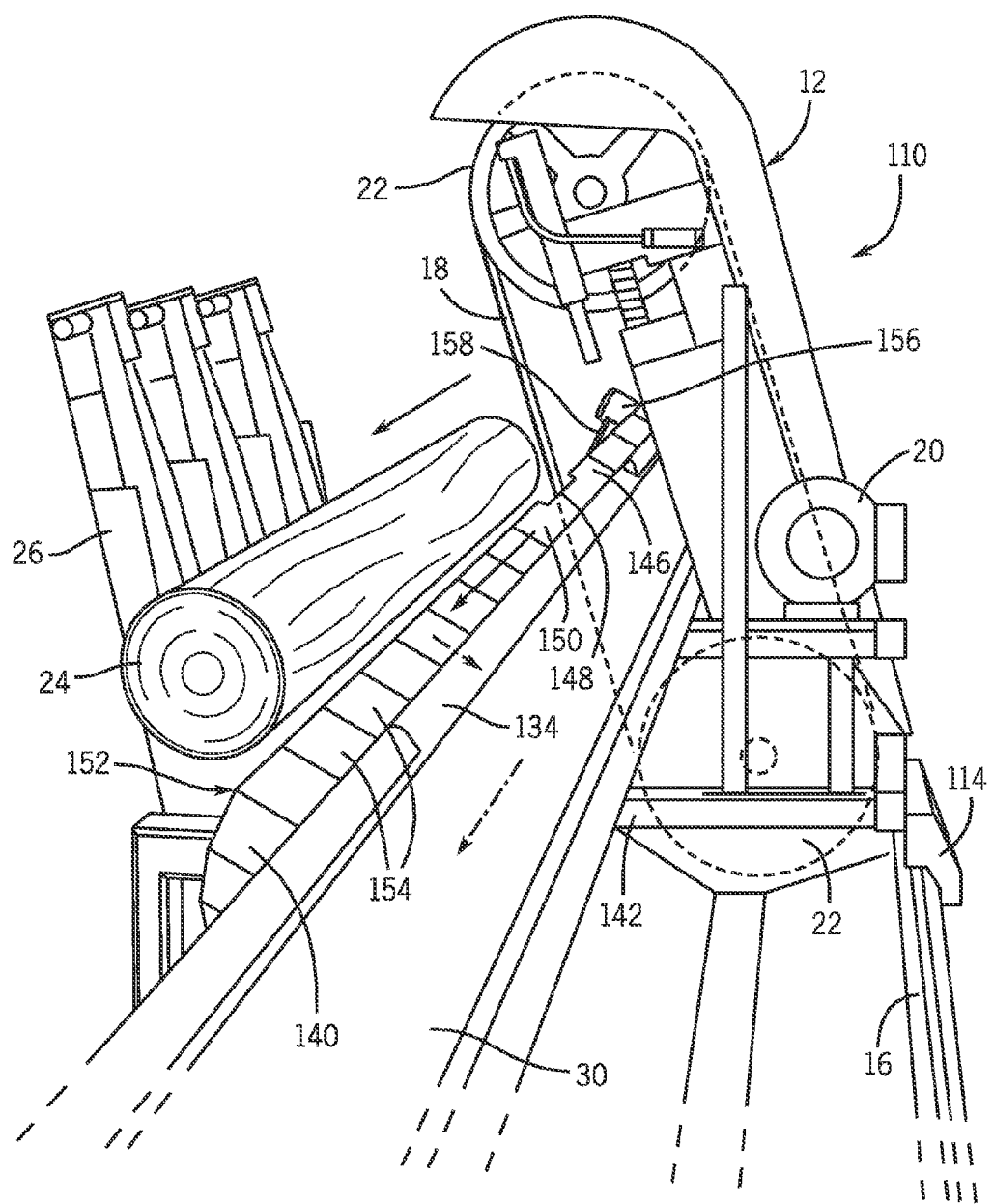
FIG. 3 is a perspective view of a sawmill having a moving shear rail in accordance with one embodiment of the invention.

FIG. 3 shows a sawmill 110 constructed according to a preferred embodiment of the invention and will be referred to in the description as an illustrative and non-limiting example. Applicant anticipates that various options and alternatives will be apparent and it is not intended limit the present disclosure in any way.

The sawmill 110 includes a band saw 12, substantially as described above. That is, band saw 12 is mounted on a carriage 114 that is capable of moving back and forth in a reciprocating motion along a track 16. Carriage 114 is moved back and forth by any suitable means, such as the conventional means as described above with regard to the sawmill 10. The band saw 12 includes a continuous loop blade 18, which is driven by, among other things, a motor 20 and reeved about pulleys 22. In operation, a log 24 is held on a cradle or bunk 26 and oriented generally parallel to the track 16 and the direction of movement of the band saw 12. The bunk 26 holds the log 24 in proximity to the band saw blade 18, and has the capability to move the log toward the band saw 12, with some portion of the log extending beyond the bunk, so as to enable the band saw to cut a segment 28 (FIG. 4), whether it be a slab or board or plank, from the log. Once cut, each segment 28 ends up in a face-up orientation on a conveyor 30, which is supported on a support 32, to be conveyed to another destination for further processing.

Figure 4:
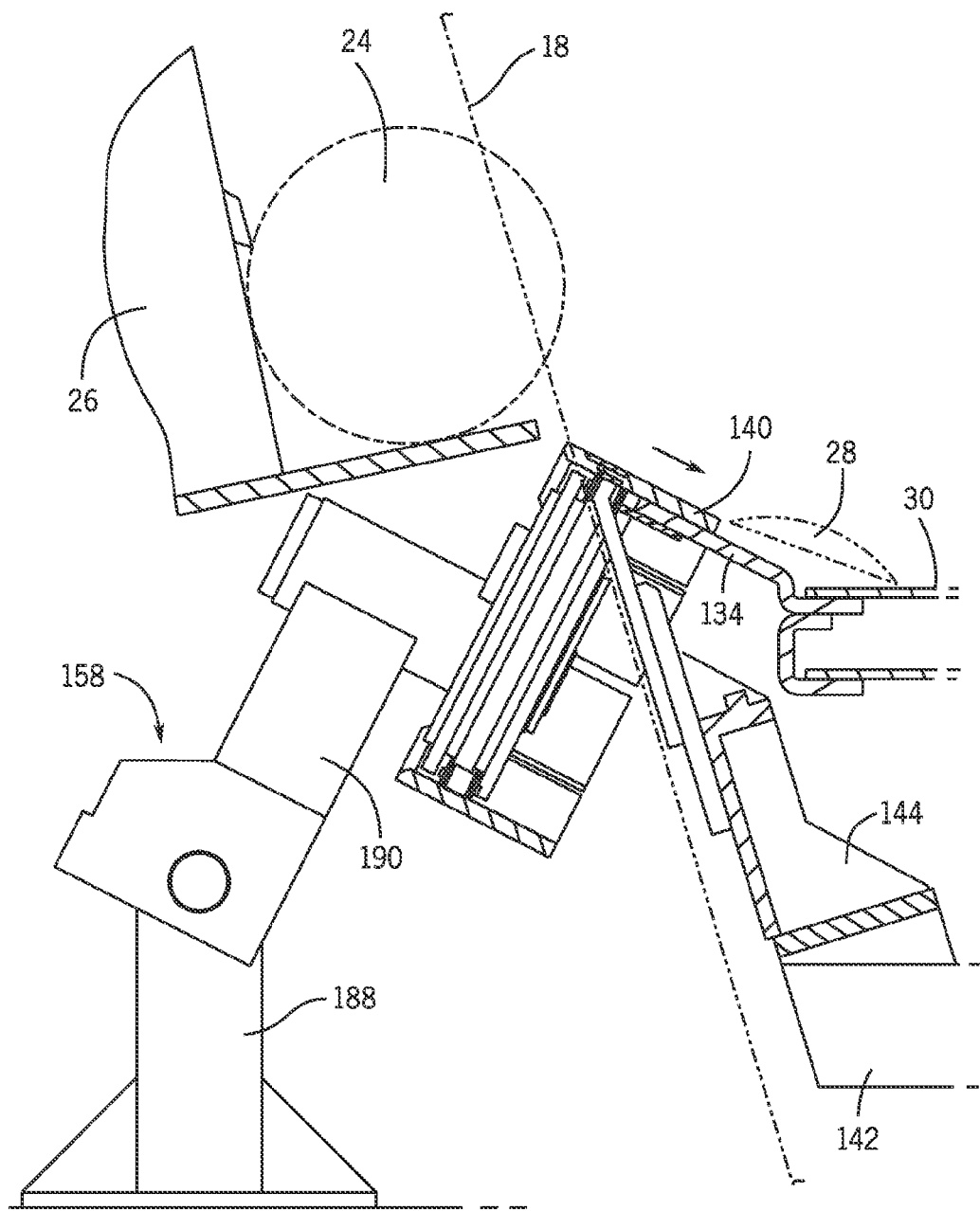
FIG. 4 is a cross-sectional view of the shear rail shown in FIG. 5, taken along line 4-4 of FIG. 5.

According to the invention, in the sawmill 110, as the segment 28 is cut, the segment first contacts and drops onto a moving shear rail 140, which moves with the band saw 12 as the band saw reciprocates back and forth, cutting segments off the log. As shown in FIG. 3, a beam 142 is connected to carriage 114 and extends beneath the conveyor 30. As shown in FIG. 4, to the distal end of the beam 142 is mounted a moving shear rail support 144 that extends upward from the beam, on the far side of the conveyor from the band saw 12. The moving shear rail 140 is affixed to the moving shear rail support 144, and thus moves in a synchronized fashion with band saw 12, as the latter moves back and forth in a reciprocating motion along track 16, cutting segments 28 from the log 24. Similar at least in this sense to stationary shear rail 34, moving shear rail 140 is mounted so as to extend outward from the side of the conveyor 30 toward the uncut log 24, at an angle, from close to the conveyor upward toward the log, so as to act as a ramp or funnel, so that the cut segment 28 will slide downward along that angle and end up on the conveyor, face up. The band saw blade 18 has a predetermined width, and in the direction of motion of the band saw 12, the length of the moving shear rail 140, and in fact the upper edge 146 of the moving shear rail, is substantially greater than the width of the blade. The upper edge 146 has a notch 148 formed therein, where the cross-motion dimension, or width, of the shear rail is narrower. The length of the notch 148 is also greater in length than the width of the blade 18, but preferably only slightly greater, on the order of a ratio of about 5:4, length of notch to width of blade. This way, different size blades will require generally proportionally different size notches.

Figure 1:
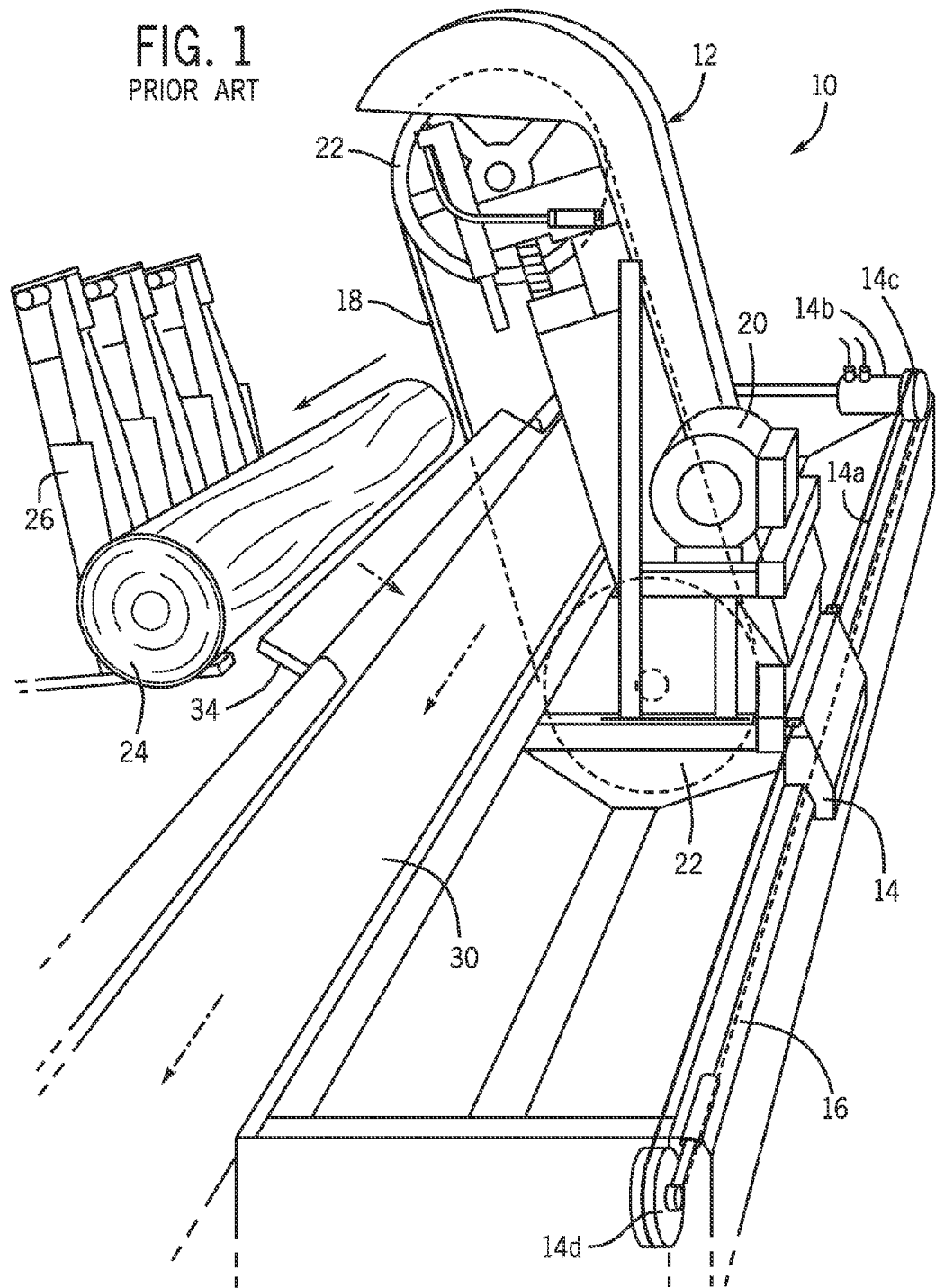
FIG. 1 is a perspective view of a prior art sawmill with a stationary shear rail.
Figure 2:
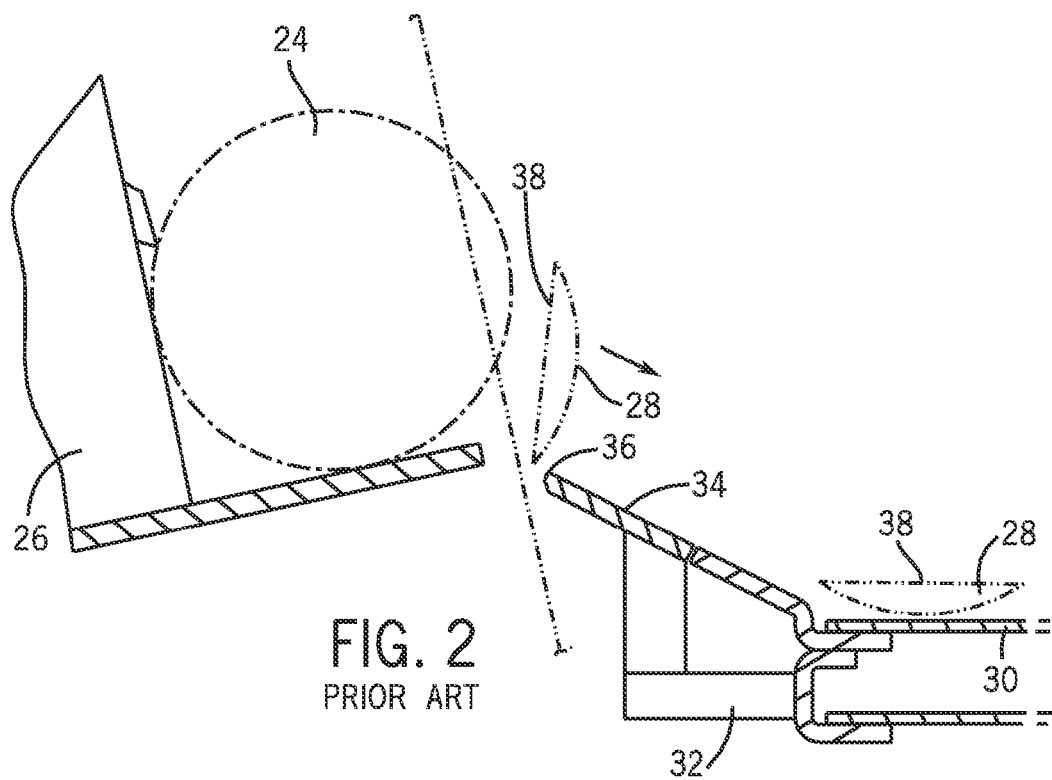
FIG. 2 is a side view, partially in section, of the prior art sawmill shown in FIG. 1.

The moving shear rail 140 is mounted to the shear rail support 144 in such a position that the upper edge 146 of the moving shear rail 140 is at least even with, and preferably beyond, the blade 18, while the notch 148 surrounds the blade. By this means, the gap 36 (FIG. 2) between the old stationary shear rail and the blade is substantially eliminated, and the segments 28 will reliably fall onto the moving shear rail 140, and thereafter slide face up onto the conveyor 30. The conveyor 30 may also be supplied with a secondary, stationary, shear rail 134, which may be positioned between the moving shear rail 140 and the surface of the conveyor, to ensure a smooth slide for the segments 28.

Figure 5:
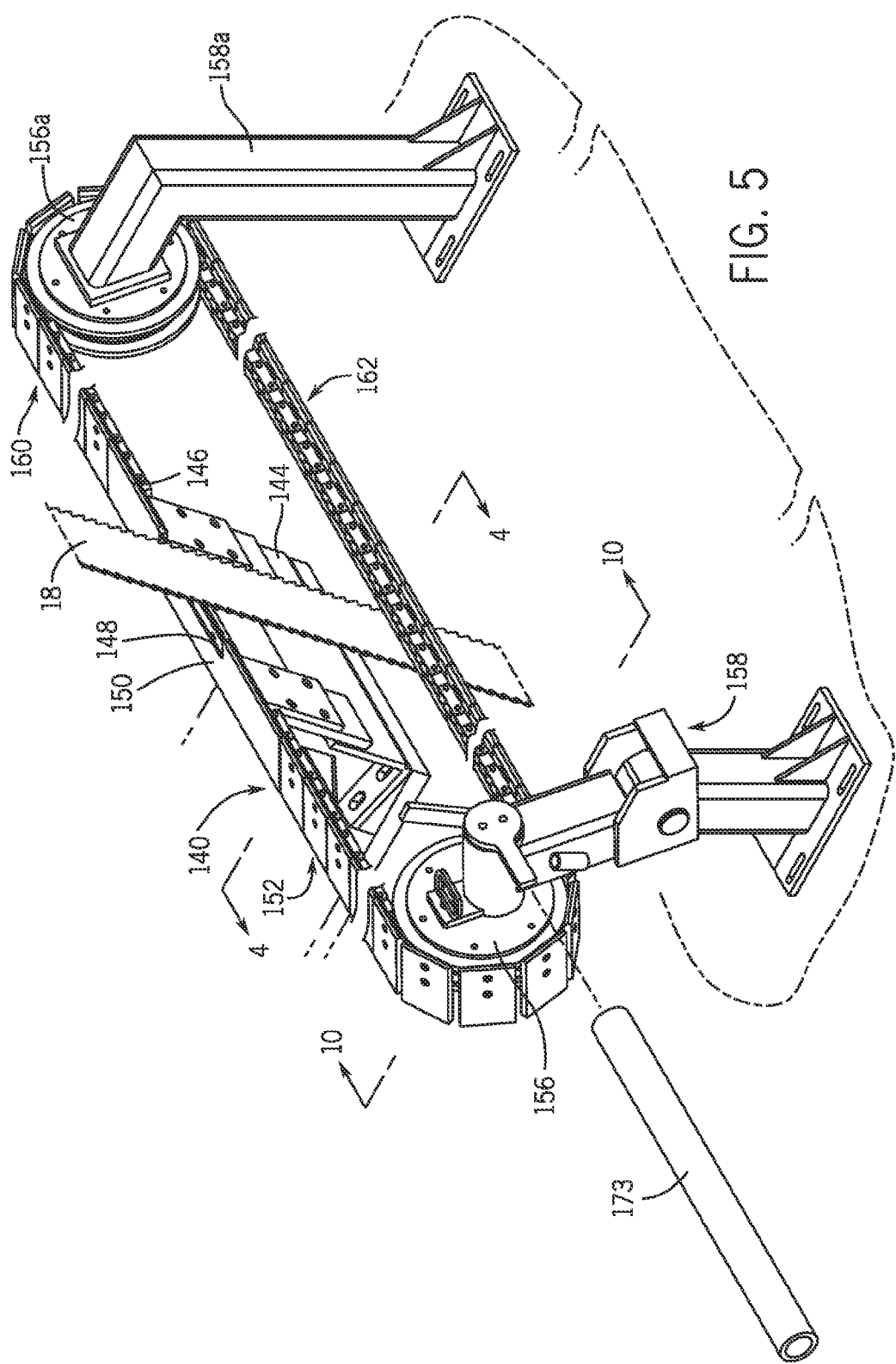
FIG. 5 is a perspective view of the shear rail shown in FIG. 3, and its supporting structure, with most of the rest of the sawmill removed.

In the embodiment shown in FIGS. 3-12, the moving shear rail 140 is formed of a shear rail plate 150 that forms the upper edge 146 and the notch 148. In a preferred embodiment, the shear rail 140 is also formed of a flexible element 152, so that, as the band saw 12 moves toward one end of the conveyor 30, the moving shear rail does not need to extend beyond the end of the conveyor. In the most preferred embodiment, as shown, the flexible element 152 is comprised at least in part of links 154 of a conveyor chain, rotatably connected together in a substantially conventional manner as is well known in the art, and connected to each end of the moving shear rail plate 150. Referring mainly to FIG. 5, for instance, the flexible element 152 is reeved about reels 156 and 156a, each mounted to a respective one of two standards 158 and 158a which are built and secured in place for that purpose, so that the moving shear rail is positioned appropriately for catching the segment 28 as the band saw 12 cuts it from the log 24. In this embodiment, the moving shear rail 140, comprised as it is by flexible element 152 and the shear rail plate 150, thus forms a closed loop reeved, as indicated above, about the reels 156 and 156a. In this configuration, moving shear rail 140 has an upper flight 160, of which shear rail plate 150 is always a part, and a lower flight 162, opposite the upper flight. The flexible element 152 may be comprised entirely of links 154, as shown in FIG. 5.

In order for the moving shear rail 140 to be angled appropriately to catch the segment 28, the lower flight 162 must be positioned so that it is not directly below the upper flight 160, but rather, is offset slightly, away from the band saw 12. That is, reels 156 and 156a hold the moving shear rail 140 so that the upper surface of the moving shear rail is angled downward toward the band saw 12 and conveyor 30, meaning that the lower flight 162 is further away from the band saw than is the upper flight 160. This positioning requires, for the band saw 12 to work properly, that the blade 18 passes through the loop formed by the moving shear rail 140. The fact that the band saw blade 18 is a continuous loop, and the moving shear rail 140 is a continuous loop, presents a problem, in that the blade must be changed regularly, for sharpening and other maintenance. Accordingly, the invention calls for the moving shear rail 140 to be capable of being easily opened, so as to allow the blade 18 to be removed and replaced quickly and efficiently.

Figure 6:
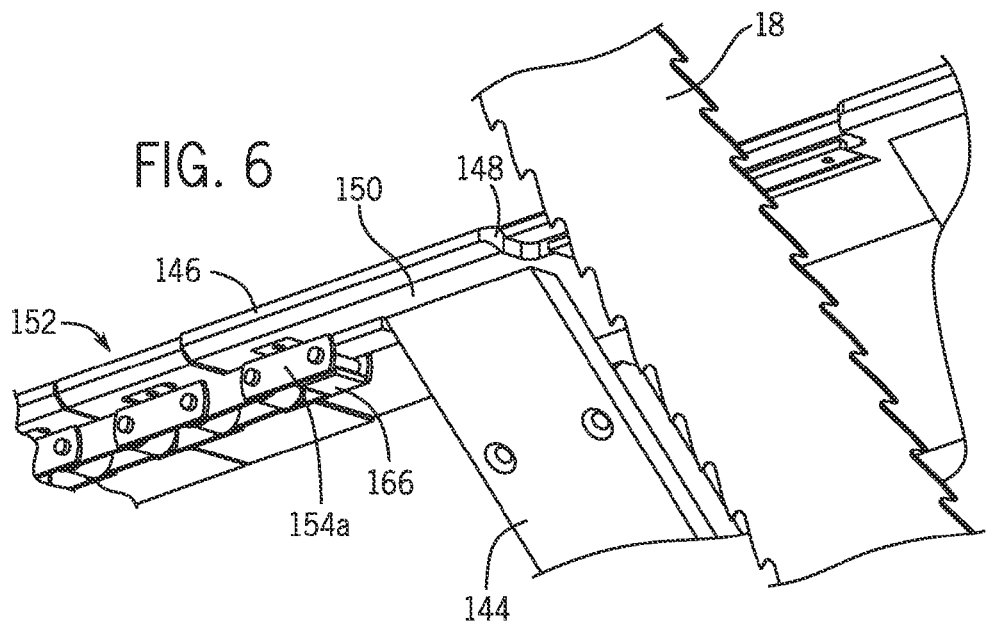
FIG. 6 is a perspective view of the underside of the shear rail shown in FIG. 5.
Figure 7:
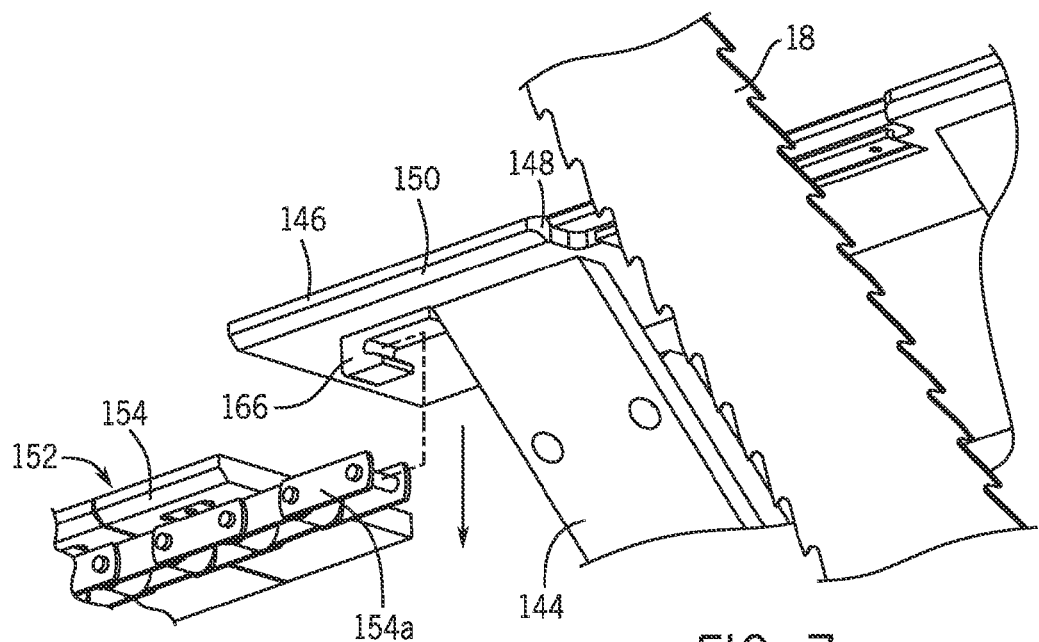
FIG. 7 is a perspective view of the underside of the shear rail similar to FIG. 6, but with the last link of the chain disconnected from the shear rail plate.

Various means for opening the moving shear rail 140 may be provided to allow removal and replacement of the saw blade 18. In the present invention, the most preferred way of opening the moving shear rail 140 is to temporarily disconnect the flexible element 152 from the shear rail plate 150. As shown in FIGS. 6 and 7, the flexible element 152 connects to the shear rail plate 150 by means of a hook 166 that, ordinarily and in use, is engaged with the last link 154a of the flexible element 152. To maintain this engagement, and as is known in the art of conveyor chain when ordinarily in use, a certain amount of tension must be maintained on the conveyor chain when in use. Reels 156 and 156a, and standards 158 and 158a, are constructed and positioned so as to provide that tension in normal production use.

As shown at FIGS. 8 through 12, in order to disconnect the last link 154a from hook 166, and therefore disconnect flexible element 152 from the shear rail plate 150, so that the blade 18 can be quickly efficiently removed and replaced for maintenance, the invention provides a structure to release the tension on the movable shear rail 140.

Figure 8:
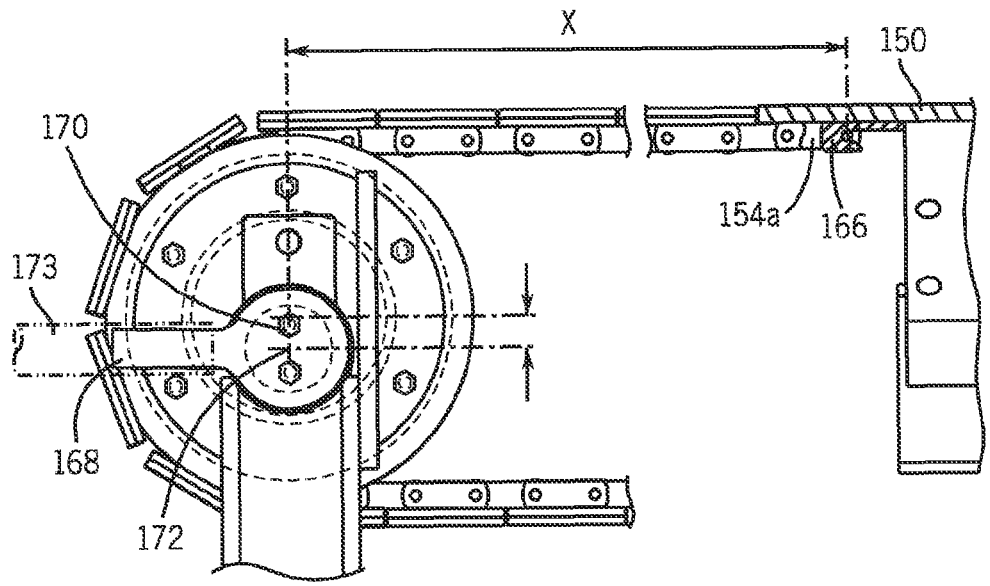
FIG. 8 is a side elevation view of one end of the shear rail shown in FIG. 5.
Figure 9:
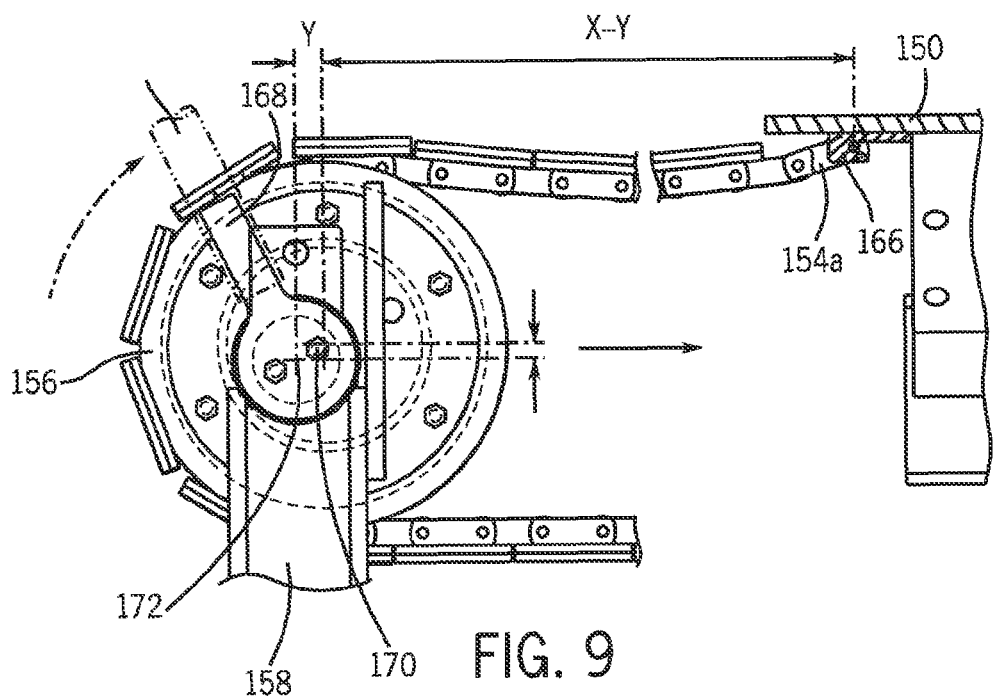
FIG. 9 is a side elevation view of the end of the shear rail shown in FIG. 8, but showing the reel in a different position.

Specifically, as shown best in FIGS. 8 and 9, reel 156 is connected to standard 158 by means of an offset pivot, so that the reel has an engaged position, shown in FIG. 8, and a released position, shown in FIG. 9. In the most preferred embodiment, reel 156 is pivotably connected to a lever 168 by means of a lever/reel pivot 170. In turn, lever 168 is pivotably connected to standard 158, by means of a lever/standard pivot 172, the pivot point of which is offset from that of the lever/reel pivot 170. Thus the lever 168 serves to move the reel 156 between the engaged position, shown in FIG. 8, and the released position, shown in FIG. 9. Ordinarily, when the moving shear rail 140 is in use, the reel 156 and lever 168 are in the engaged position, where the flexible element 152 is in tension, and the last link 154a is held engaged in the hook 166. When it is time to remove and replace the blade 18, the lever 168 is moved to the released position, in which the reel 156 is nearer the hook 166. With the reel 156 in that position, the tension on flexible element 152 is released, and the last link 154a may be disengaged from the hook 166. Most specifically, with the lever 168 in the engaged position, as shown in FIG. 8, the distance between the center of the reel 156 and the hook 166 is X. When the lever 168 is in the disengaged position, the center of the reel 156 has moved toward the hook 166 a distance of Y, and so the hook and the center of the reel are separately only by X-Y. The specific distances are within the skill of a person of ordinary skill in the art, with the only real limitation being that the distance Y must be sufficient to permit the last link 154a to be disengaged from the hook 166. If desired, a lever extension 173 may be provided, which can be removably applied to lever 168 so as to provide additional leverage and thus assist in moving the lever between the engaged position and the released position.

Figure 10:
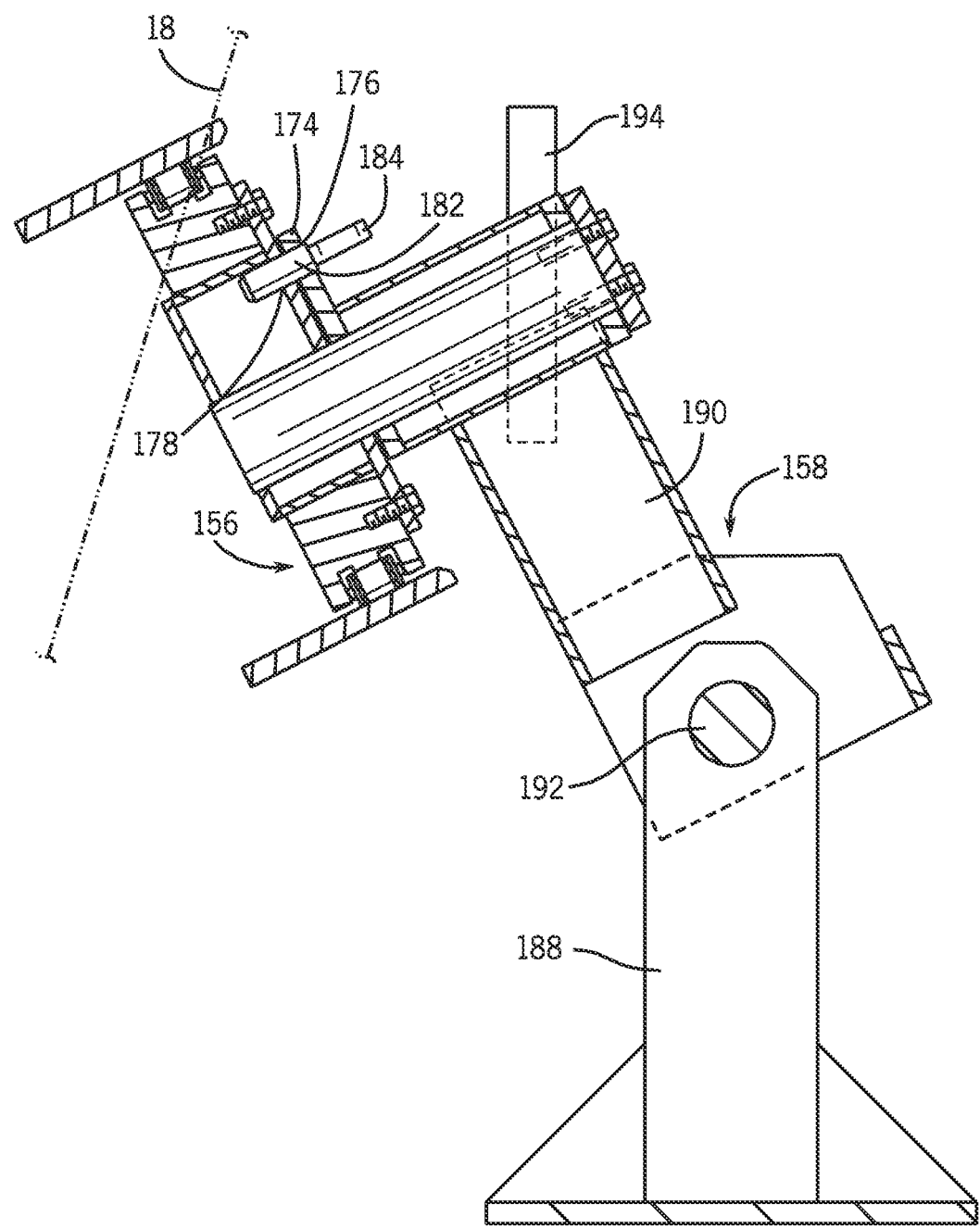
FIG. 10 is a cross-sectional view of the shear rail shown in FIG. 5, taken along line 10-10 of FIG. 5.
Figure 11:
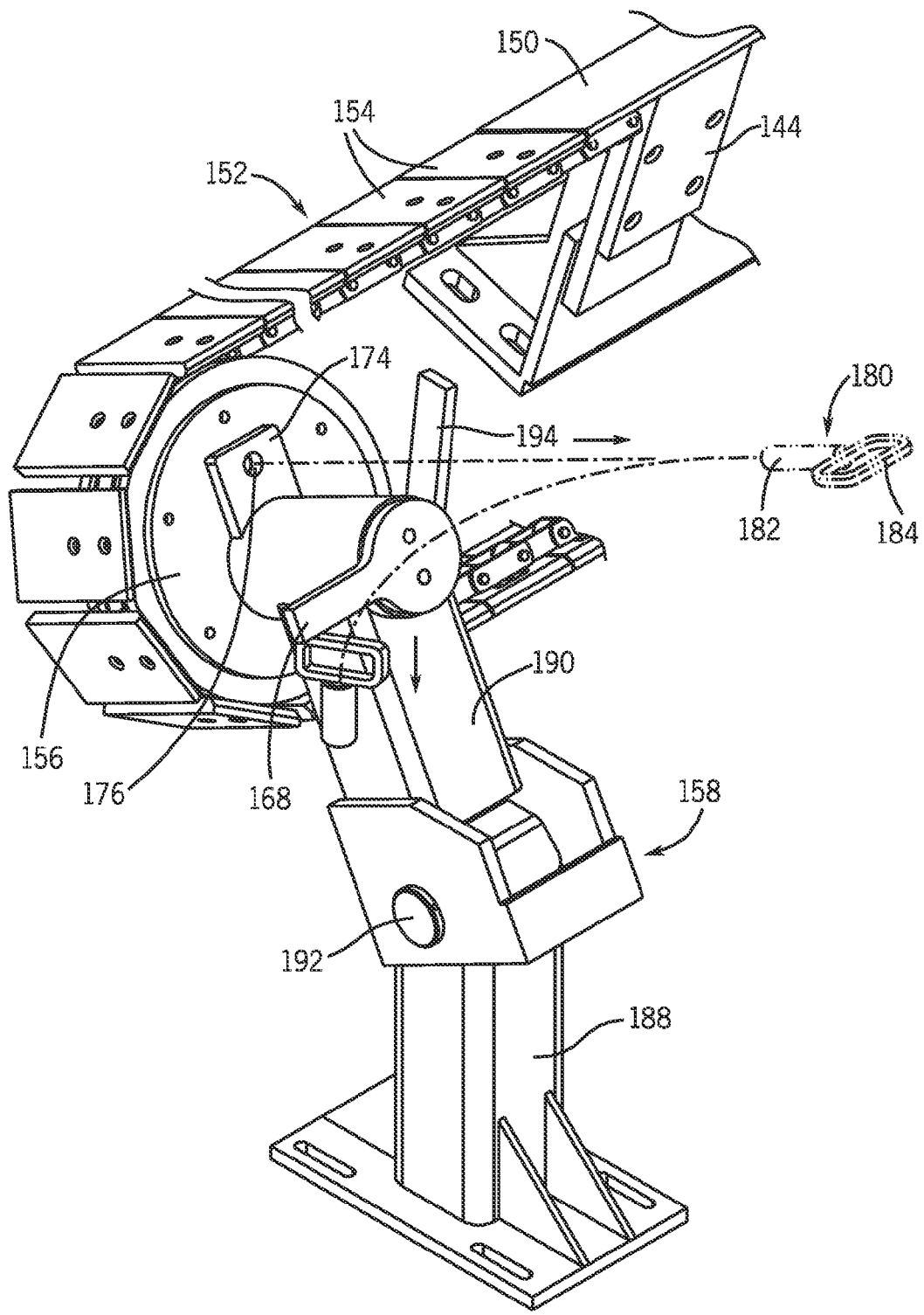
FIG. 11 is a perspective view of the end of the moving shear rail shown in FIGS. 8 and 9, including the reel about which the shear rail moves, showing additional detail.

When in use, it is best to provide a lock to ensure that the tension described above is maintained. As shown in FIGS. 10 and 11, this locking function is provided by a tang 174 connected to the standard 158, the tang having a tang aperture 176. The reel 156 is also provided with a reel aperture 178. The tang aperture 176 is positioned on the tang 174, and the reel aperture 178 on the reel 156, so that the two apertures are aligned when the lever 168 is in the engaged position described above. A key 180, formed of a key body 182, of appropriate length and cross sectional shape, is inserted when the two apertures 176, 178 are aligned. The cross sectional shape of the two apertures 176, 178 is shown as round, but any suitable cross sectional shape would work, the only requirement being that the cross sectional shape of the key body 182 matches the shapes of the apertures sufficiently so that the insertion and removal of the key is possible, and the key provides sufficient locking function. The key 180 may also include a handle 184, connected to the key body 182, for ease of use. Insertion of key 180 into apertures 176, 178 thus locks the reel 156 in its engaged position. As shown in FIG. 11, the key 180 must be removed as a first step in releasing the tension, in the process described earlier. A key storage pocket 186, formed of a pipe or tube to permit easy insertion and removal of the key 180, may be provided in any suitable location including that shown in FIG. 11, at the side of the standard, for conveniently storing the key during the process of removing and replacing the saw blade 18.

In order to further facilitate the removal and replacement of the blade 18, the standard 156 is provided in multiple parts. As shown in FIG. 12, it can be seen that, in the embodiment shown, the standard 156 includes a lower leg 188 mounted or at least resting on a surface, and an upper leg 190 pivotably connected to the lower leg by means of a pivot axle 192. Using this multi-part standard 156, once the moving shear rail 140 is opened, as described above, the reel 156 can be pivoted from its in-use position, shown in phantom in FIG. 12 and also as shown in FIGS. 5, 10 and 11, out of the way to an away position, as shown in solid lines in FIG. 12, further facilitating the removal and replacement of the blade 18. If desired, a pivot lever 194 may be provided, attached to the upper leg 190 so as to assist in moving the reel from its in-use position to its away position. A pivot lever extension 196 may also be provided, which may be removably applied to pivot lever 194 so as to further assist in the movement described.

FIG. 10 is also where it is most clearly shown that, in the most preferred embodiment, the moving shear rail 140 reaches beyond the band saw blade 18, that is, that the upper edge 146 of the moving shear rail is behind, or further from the conveyor 30 than, that portion of the blade.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A sawmill for cutting segments from a log, comprising:
a moving shear rail for use with a band saw, the band saw having a band saw blade, the blade having a predetermined width, and the band saw mounted on a carriage for moving the band saw in proximity to a log, for cutting segments from the log, the moving shear rail comprising a shear rail plate, having an upper edge and a notch formed in the upper edge, the shear rail plate connected to the carriage for moving with the band saw, the shear rail plate positioned so that the notch is aligned with the band saw blade and the upper edge of the moving shear rail plate extends at least to even with the band saw blade, wherein the shear rail plate has two opposing ends,
a flexible element connected at each of the two opposing ends of the shear rail plate so as to move with the shear rail plate as the shear rail plate moves with the band saw, and
a pair of reels, one reel positioned in proximity to each of the band saw ends of travel, about which the flexible element is reeved.

2. A moving shear rail as recited in claim 1 wherein the flexible element is formed of a plurality of conveyor links.

3. A moving shear rail as recited in claim 2 wherein the conveyor links include a last link removably connected to the shear rail plate.

4. A moving shear rail as recited in claim 3 wherein the reels apply tension to the flexible element, and further comprising means for selectably releasing tension on the flexible element, to thereby permit the last link to be disconnected from the shear rail plate.

* * * * *